(12) United States Patent
Niclass et al.

(10) Patent No.: US 8,810,647 B2
(45) Date of Patent: Aug. 19, 2014

(54) TIME-OF-FLIGHT BASED IMAGING SYSTEM USING A DISPLAY AS ILLUMINATION SOURCE

(75) Inventors: Cristiano Niclass, Clarens (CH);
Edoardo Charbon, Echandens (CH);
Julian Nolan, Pully (CH)

(73) Assignee: Ecole Polytechnique Federale de Lausanne (EPFL), Lausanne (CH)

(*) Notice: Subject to any disclaimer, the term of this patent is extended or adjusted under 35 U.S.C. 154(b) by 452 days.

(21) Appl. No.: 12/900,798

(22) Filed: Oct. 8, 2010

(65) Prior Publication Data
US 2011/0037849 A1  Feb. 17, 2011

Related U.S. Application Data

(63) Continuation of application No. PCT/EP2008/054450, filed on Apr. 11, 2008.

(51) Int. Cl.
*H04N 7/18* (2006.01)
*G01S 7/481* (2006.01)
*G01S 17/89* (2006.01)
*G06F 3/042* (2006.01)

(52) U.S. Cl.
CPC ............ *G06F 3/0421* (2013.01); *G01S 7/4814* (2013.01); *G01S 17/89* (2013.01)
USPC .......................................................... 348/135

(58) Field of Classification Search
CPC ....... G01B 11/024; G01B 11/026; G02F 2/00
USPC .......................................................... 348/135
See application file for complete search history.

(56) References Cited

U.S. PATENT DOCUMENTS

2005/0122308 A1* 6/2005 Bell et al. ...................... 345/156
2007/0182949 A1   8/2007 Niclass
2008/0122792 A1* 5/2008 Izadi et al. ..................... 345/173

OTHER PUBLICATIONS

T. Oggier, M. Lehmann, R. Kaufmann, M. Schweizer, M. Richter, P. Metzler, G. Lang, F. Lustenberger and N. Blanc, An all-solid-state optical range camera for 3D real-time imaging with sub-centimeter depth resolution (SwissRanger), Optical Design and Engineering, Proceedings of SPIE, vol. 5249, Feb. 18, 2004, pp. 534-545.
C. Niclass, A. Rochas, R.A. Besse, and E. Charbon, A CMOS 3D Camera with Millimetric Depth Resolution, IEEE 2004 Custom Integrated Circuits Conference, Oct. 3-6, 2004, pp. 705-708.

* cited by examiner

*Primary Examiner* — Richard Torrente
(74) *Attorney, Agent, or Firm* — Blank Rome LLP

(57) ABSTRACT

The present invention concerns a time-of-flight based imaging system having a photon emitter used as an illumination source, a photon sensor, and an electronic system for delivering a signal depending on the reception time of photons by said photon detector. The electronic display is used as the photonic source.

19 Claims, 3 Drawing Sheets

TIME-OF-FLIGHT BASED IMAGING SYSTEM USING A DISPLAY AS ILLUMINATION SOURCE

The present application is a continuation of international application WO08EP054450 filed on Apr. 11, 2008, the content of which being hereby incorporated by reference.

FIELD OF THE INVENTION

The present invention concerns a time-of-flight based imaging system, more particularly a low power, versatile and low cost time-of-flight based imaging system.

DESCRIPTION OF RELATED ART

The emergence of novel potentially high-volume applications for three-dimensional (3D) optical imaging has generated renewed interest in such devices. These applications include land and sea surveyors, virtual keyboards, face recognition systems, non-ionising medical tomographic imagers, stage and choreography analysis tools, etc. A new generation of solid-state imagers has been designed to address concerns of compactness and speed. However, power, safety, and cost limitations still exist.

Current solid-state 3D optical imaging is based on three main techniques: triangulation, interferometry, and time-of-flight (TOF) using modulated and pulsed laser sources. All these methods have advantages and shortcomings and have been extensively researched. In triangulation systems, distance to a precise point in the scene is derived from the angle of incidence of a known point source and the angle of reflected light, whereby a conventional optical sensor is usually capturing such reflection. The main disadvantage of such systems is the speed requirement on the sensor, power dissipation, and a somewhat limited precision. Interferometry is being used for the high levels of accuracy it ensures. However, interferometers are usually bulky and very expensive.

Optical TOF rangefinders using highly collimated coherent light sources have been technologically feasible for decades. Such devices, based on a pulse method, measure the distance and velocity of a target by calculating the time the optical ray requires completing a round trip. This time can be measured explicitly by means of a fast chronometer or time to digital converter (TDC). Alternatively, an implicit measurement is also possible by evaluating the phase difference between a modulated light source and the reflected light from the target. Here, the distance between the photon sensor and the object is directly proportional to measured phase difference. For these imagers, megahertz or higher modulation frequencies, in conjunction with homodyne phase discrimination and averaging at the pixel level, have been successfully used to relax circuit specifications.

Continuous modulation offers the advantage of using off-the-shelf and therefore low-cost components in the illumination sub-system. Compared to the pulsed method, a larger variety of light sources is available for this mode of operation as extremely fast rise and fall times are not required. An example of low-cost optical sources that can be used in the continuous modulation method is an array of light emitting diodes (LEDs).

A high-resolution 3D camera employing continuous-modulation based TOF distance measurement principle is described in T. Oggier et al., "An all-solid-state optical range camera for 3D real-time imaging with sub-centimeter depth resolution (SwissRanger™)", SPIE Proc Vol. 5249-65, St. Etienne, 2003. In this document, modulated infrared light (IR) generated from an illumination unit containing an array of forty-eight LEDs is reflected by objects in the scene and travels back to the camera, where its precise time of arrival is measured independently by each of the photon sensor pixels of a 3D sensor based on a CMOS/CCD technology. Since the charge carrier transport mechanism of most CCDs is based on a thermal diffusion process rather than on a drift effect, the maximum achievable demodulation frequency is severely limited. The maximal acceptable frequency reported was 20 MHz, thus preventing the rangefinder from reaching millimeter accuracy.

Patent application US2007182949 by the present applicant, describes a rangefinder system comprising an array of LEDs emitting a periodic continuous modulated optical signal for illuminating an object. The reflected modulated optical signal is imaged on a solid-state photon sensor, containing an array of avalanche photodiodes and circuits to yield the distance between the rangefinder and the object. The use of avalanche photodiodes increases the sensibility to light, allowing even single photon detection.

The use of a separate illumination unit using a laser or LEDs increases the cost and complexity of manufacture of the camera unit because an additional component, the LED module, must be provided together with appropriate electrical connectors, power supplies and electronics. Separate illumination also increases the volume of the camera and requires additional power. These drawbacks are undesirable in most applications and become critical in particular in mobile consumer applications that demand low power, small volume and low cost. Indeed, these drawbacks of currently used illumination units limit the use of 3D TOF imaging on mobile devices.

BRIEF SUMMARY OF THE INVENTION

An object of the invention is therefore to propose a new system and method which overcomes at least some limitations of the prior art.

According to the invention, these objectives are achieved by means of a system and method comprising the features of the independent claims, preferred embodiments being indicated in the dependent claims and in the description.

These objectives are also achieved by a TOF imaging system characterized in that a backlit display comprises a backlight assembly used as illumination source, and an electronic display placed in front of the backlight assembly.

In an embodiment of the invention, the backlight assembly comprises LEDs emitting in the visible spectrum that are continuous modulated, possibly with a sinusoidal signal, with a period of duration less than a few microseconds, possibly a duration of a few nanoseconds in order to produce a modulated illumination for the photon sensor of the imaging system.

In another embodiment, the backlight assembly comprises IR LEDs that are continuous modulated and used as illumination source for the photon sensor of the imaging system.

In yet another embodiment, the LEDs of the backlight assembly are driven in such a way as to successively emitting light from successive regions of the display to illuminate the photon sensor.

In yet another embodiment of the invention, the photon sensor is mounted on a device that is remote from the display, for example, a remote controller.

In yet another embodiment, the LEDs of the backlight assembly are modulated with pulses or train of pulses in a pulsed method in order to produce a modulated illumination for the photon sensor of the imaging system.

The imaging system of the present invention does not require a separate illumination unit and can be optimized to operate at low power. The imaging system is also versatile since it can easily be implemented in various configurations including, for example, mobile devices, computer displays and game consoles, possibly in a low cost configuration.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
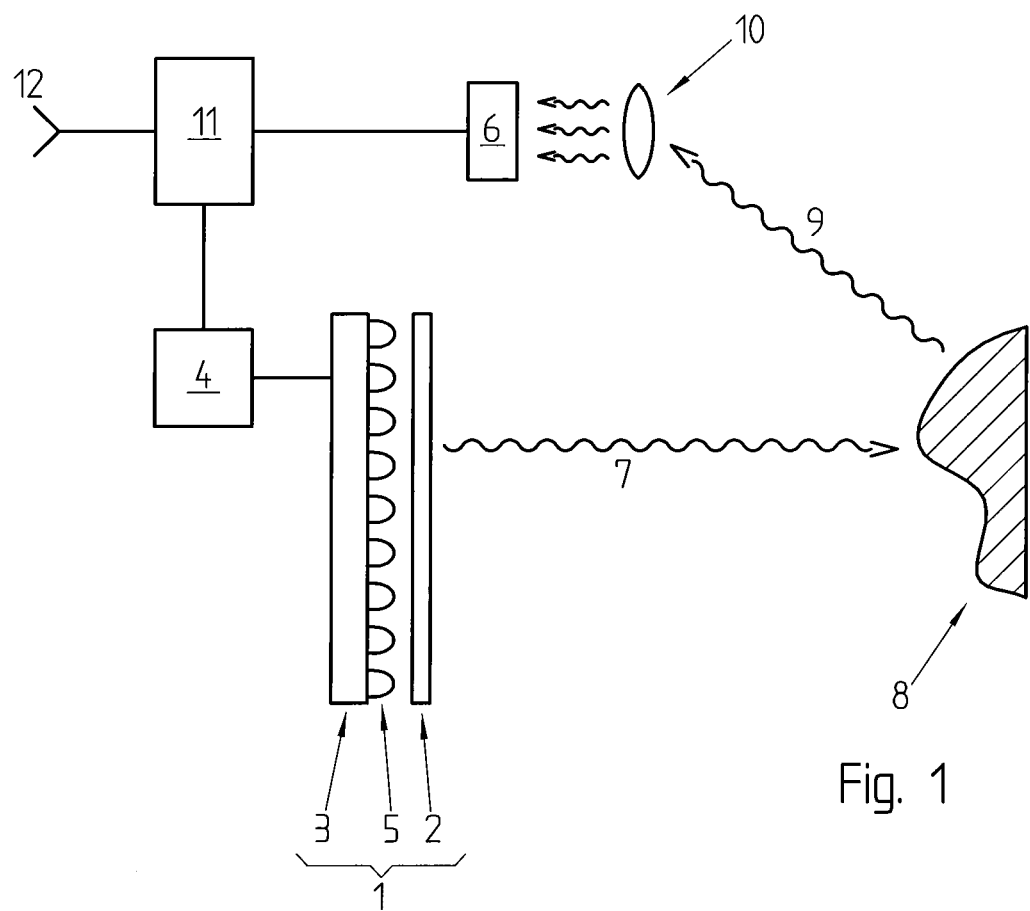
FIG. 1 shows an imaging system according to an embodiment of the present invention.

FIG. 1 illustrates an example of realization of an imaging system according to an embodiment of the present invention. The imaging system includes a backlit display 1 comprising an electronic display 2, such as an LCD display, and a backlight assembly 3, placed behind the electronic display 2 and comprising an array of LEDs 5 for illuminating the electronic display 2. The imaging system also comprises a backlighting driver 4 for adjusting the amount of current provided to the backlight assembly 3 and the corresponding light intensity of the LEDs 5; and a photon sensor 6 or array of sensors, placed, in this example, on one side of the electronic display 2 or possibly behind. In the present invention, a light signal 7 is emitted by a photon emitter, here the backlit display 1. The emitted light signal 7 reaches an object 8 and the reflected light signal 9 travels back to the photon sensor 6. The emitted light signal is described in more details below. An imaging lens 10 can be placed in front of the photon sensor 6 in order to image different points of the object 8. The sensor 6, or array of sensors, delivers a signal which depends on the TOF of the light and from which the distance to the object 8, or a 3D representation of this object, can be computed by a signal processing module 11 or directly in the array, and displayed by means of a communication interface module 12.

Figure 2:
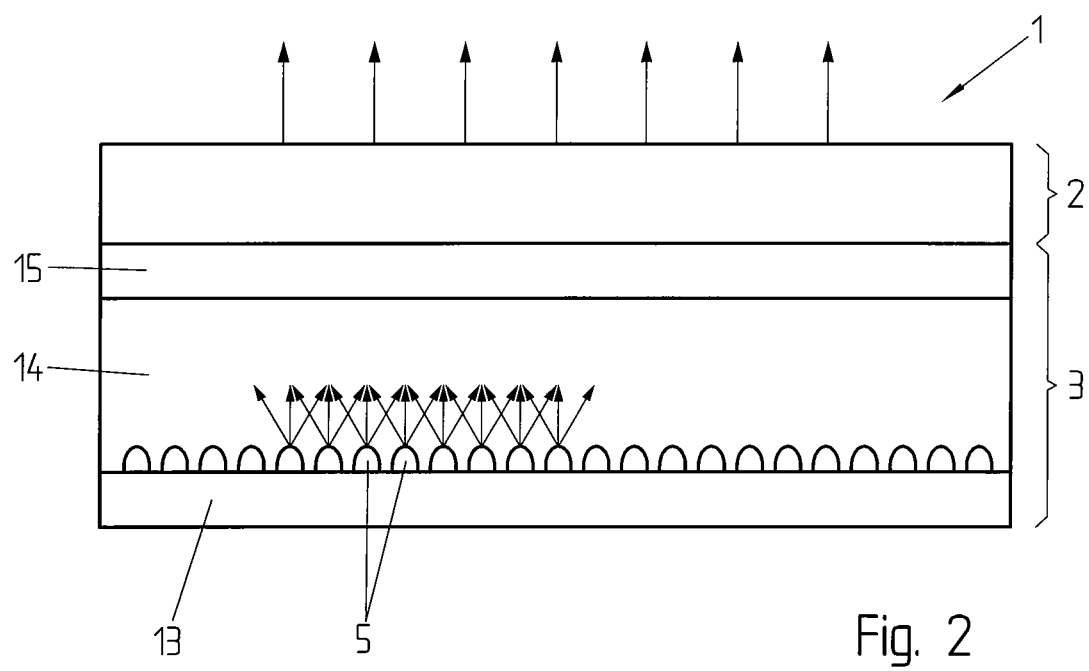
FIG. 2 is a cross-sectional view of a direct backlight assembly.

FIG. 2 shows a cross-sectional view of the backlit display 1 comprising the electronic display 2 and the backlight assembly 3. The backlight assembly 3 comprises an array of LEDs 5 emitting in the visible spectrum, disposed on a substrate 13 and providing an illumination directly behind the display 2. Such a configuration is also called direct backlight. The number of LEDs in the array usually depends on factors such as the size of the display 2 and the desired intensity. The LEDs 5 may be arranged in any pattern that provides a desired amount of illumination. The LEDs may be addressed individually or different sections supporting one or more LEDs may be successively addressed. Typical backlight assembly 3 often comprises a diffuser 15 to distribute the light rays with substantial uniformity. The diffused light passes through the display 2 displaying a video content and towards the object.

Figure 3:
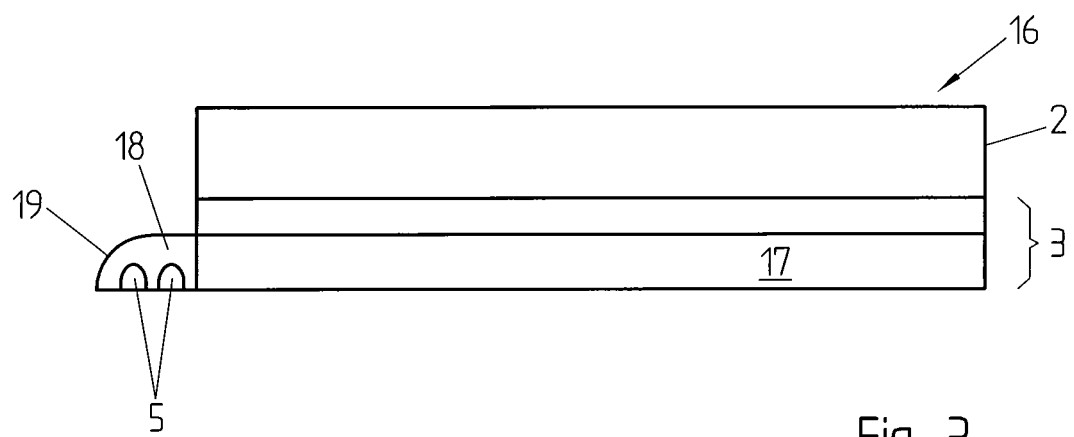
FIG. 3 is a cross-sectional view of an indirect backlight assembly.

Alternatively, the display 2 may be indirectly illuminated using an indirect backlight assembly comprising an edge illumination assembly 16 containing at least one row of LEDs 5, located on one side of the edge illumination 16, and a light guide 17. Such an indirect backlight assembly is shown in FIG. 3. A reflector 19 reflects the output of the LEDs 5 into the light guide 17 where it propagates by total reflection and exits through apertures or via other light extraction features (not shown) along the light guide 17 in the diffuser 15 and display 2. The backlit display 1 may also combine the edge illumination assembly 16 with the direct backlight assembly 3 described above.

The backlight assembly 3 of the invention can be fitted in a standard backlight configuration or can be mounted behind, on top, underneath or on the side of the display or in a combination of these configurations.

In an embodiment of the invention, the light produced by the whole display surface is used for the TOF measurement. Indeed, for small LCD displays typically used on portable devices such as mobile phones, MP3/Portable Media Players or PDAs, the approximation of a point source may apply. In a preferred embodiment, the LEDs of the backlight assembly 3 are continuous modulated with a period P of duration less than a few microseconds, preferably a duration of a few nanoseconds, for example 50 ns. The integration time has preferably a duration of at least a few microseconds, preferably at least a few milliseconds, possibly 33 ms. The modulation is preferably a sinusoidal signal although a square signal or any other signal modulation shape can be also employed. The modulated light can be superimposed on the LEDs intensity normally used for lighting the display 2. The modulation signal is provided by the backlighting driver 4 or, alternatively, by a first modulation generator (not shown) placed within the backlighting driver 4 or in an external device.

The modulated emitted light 7 passes through the display 2, is reflected by the object 8 and travels back to the photon sensor 6, where the phase delay between the emitted 7 and the modulated reflected light 9 is recorded. This phase is detected by synchronously demodulating the modulated reflected light 9 within the photon sensor 6. This demodulation can be performed by the correlation with the original modulation signal, leading to the so-called cross-correlation from which the distance of the object can be computed. The use of a single modulation frequency is known as homodyne modulation/demodulation technique. Alternatively, a TDC within the photon sensor 6 outputs a signal proportional to time between pulse sending time and pulse receiving time.

The photon sensor 6 is typically a solid-state sensor comprising one or two dimensional array of single photon avalanche photodiodes (SPAD) and a plurality of circuits for processing signals output by the avalanche photodiodes. The photon sensor 6 or array of sensors can also be an Active Pixel Sensor (APS) based, for example, on a CMOS technology (CIS); a Charge-Coupled Device (CCD); a semiconductor detector; or any other type of image sensor able to convert an optical image or light in an electric signal. The processed signals are then input in the signal processing module 11 that computes the distance or xyz position in real time. Distance and/or position may also be delivered directly from the photon sensor 6. Computed distance and/or position can be further processed in order to apply image filters and/or execute application-dedicated algorithms. Distance values and/or processed data are outputted into a communication interface module 12 that can be a USB connector, an Ethernet or a CAN bus, or a wireless connection.

Alternatively, TOF measurements may be performed using a pulsed method, where the direct round-trip time of a light beam pulse is measured. In this method, the LEDs of the backlight assembly are modulated with very short pulses or a train of very short pulses of, for example, few hundreds of picosecond. Such a technique is described in C. Niclass, et. al., "A CMOS 3D Camera with Millimetric Depth Resolution", IEEE Custom Integrated Circuits Conference, pp. 705-708, October 2004. In this reference, a solid-state SPAD sensor achieving millimeter resolution over a distance of few meters using a low power pulsed laser illumination source is reported.

In an embodiment, the backlight assembly 3 comprises white LEDs, for example, phosphor coated blue LEDs producing a visible "cool" white light or a "warmer" white light depending on the phosphor coating. In that case, the photon sensor 6 can be associated with a filter for improving sensitivity to the blue light directly emitted by said white LEDs without delay due to reemission by the coating. A mixture of white LEDs with different color temperature can also be used.

Alternatively, the backlight assembly 3 may comprise LEDs emitting in red (R), green (G), and blue (B) where a white light is obtained when the optical rays of the different RGB LEDs mix in a backlight cavity 14 of the direct backlight assembly 3 or a light mixing cavity 18 of the edge illumination assembly 16. Since the RGB LEDs can show timing dispersion (with different timing properties) between the different colors, a filter can be used around one color (e.g. green) and the other neglected. The LEDs of different colors may also be illuminated and/or modulated at different times. This requires the different color LEDs to be addressed independently.

The LEDs 5 can be any type of solid-state lightning device, including organic light-emitting diodes (OLED) or polymer light-emitting diodes (PLED), etc.

In another embodiment of the invention, the backlight assembly 3 comprises infrared or near-infrared LEDs, called IR LEDs in the rest of the text, used as a dedicated modulated light source for the TOF measurements. The IR LEDs may be added to the array of visible LEDs of the backlight assembly 3 and/or the edge illumination assembly 16, preferably uniformly distributed across the array. Optionally, some of the visible LEDs of the backlight assembly 3 and/or the edge illumination assembly 16 may be substituted by IR LEDs.

The main advantage of IR LEDs is that their modulation is not perceived by the user thus producing no artifact in the video display image. The use of IR LEDs should be generated by light-emitting diodes that are harmless to the eyes and may be limited by lower photon sensor sensitivity to IR light compared to visible light and the need for dedicated components to IR sensing making the imaging device more expensive.

Here, the IR LEDs can be modulated independently from the other visible LEDs by the backlighting driver 4. In order to increase the contrast of the IR modulated light in respect to the visible illumination, the intensity of the visible LEDs can be decreased while the IR LEDs are modulated during the TOF measurement period, or IR filters may be use in front of the photon sensor 6. Optionally, the visible LEDs and IR LEDs can be time-multiplexed at a rate which cannot be detected by human vision. This solution requires that the visible LEDs backlight be modulated on and off. The multiplexing rate can be much slower than the modulation frequency of the IR LEDs and can be also used to prevent interference between two or more displays.

Alternatively, a portion of the display is dedicated for the modulated light illumination generated by the IR LEDs. The IR LEDs may also be placed on the side of the display. An IR filter can be put in front of the photon sensor 6 in order to improve the sensitivity to the IR or near-IR light.

When using the whole surface of big displays such as computer monitors, notebook LCD display, flat display TVs, etc., for the TOF measurement, an erroneous distance estimation of the object with the TOF method may be caused by the use of a spatially extended light source. In an embodiment of the invention, this error is minimized by combining the TOF measurement technique with a triangulation method. This can be performed by using only a region of the electronic display as TOF illumination source. The surface area of the region must be small enough for the approximation of a point source to be valid. For example, a region with a surface area of a few square centimeters may be adequate for estimating the distance of an object placed at a distance of about one meter from the display. The region may have a rectangular shape or any other practical shape.

Figure 4:
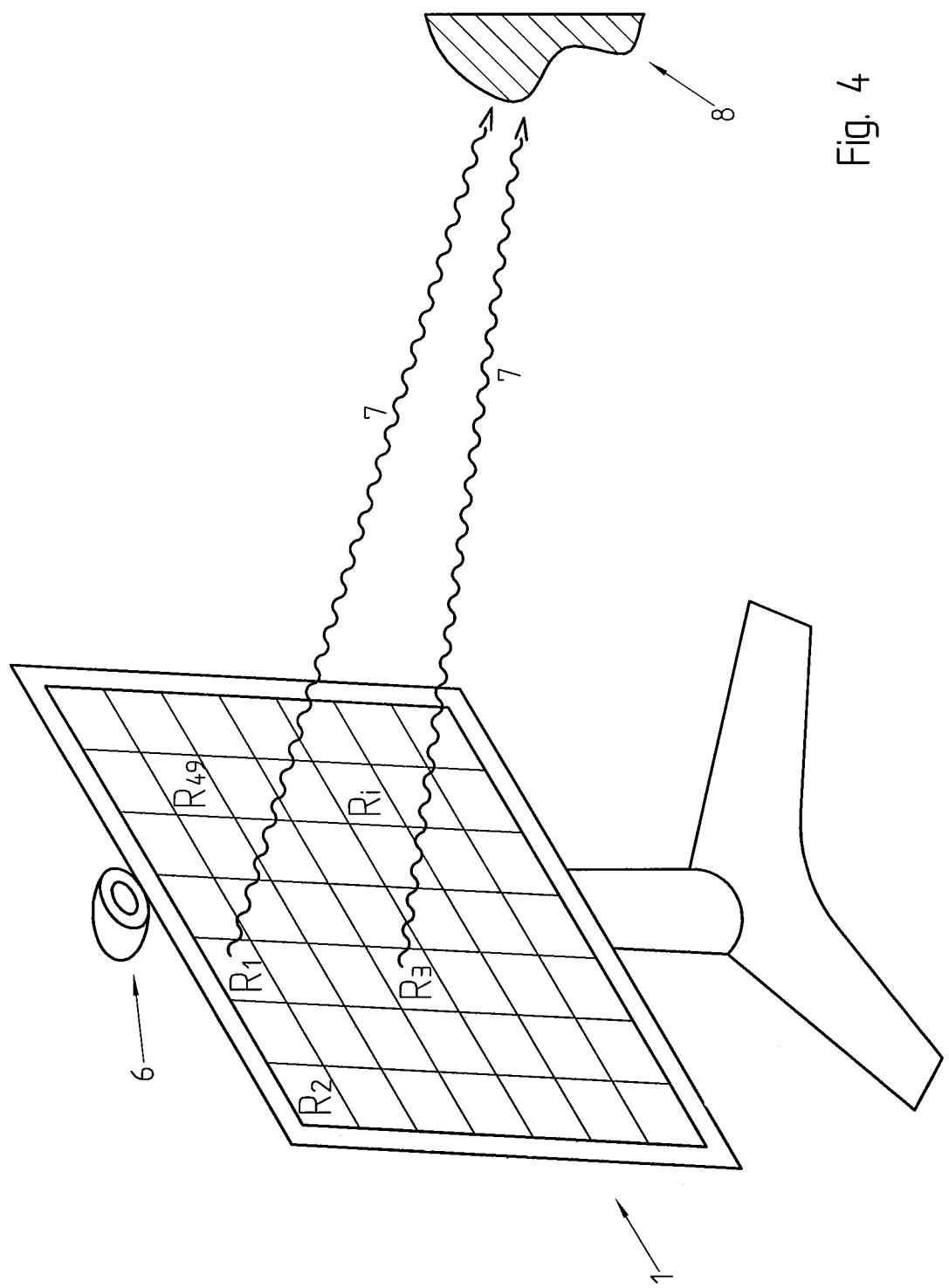
FIG. 4 illustrates the use of small illuminating regions is in the case of a computer monitor.

FIG. 4 illustrates the use of small illuminating regions in the case of a computer monitor where the surface of the display 1 contains a matrix of identical rectangular regions. At any given time only one region is used as an illumination source by continuous modulating the LEDs placed directly behind the corresponding region with, for example, a sinusoidal signal having a frequency of 20 MHz. The region used for TOF illumination may be moved across the display at a frequency that is preferably not perceived by human vision, for example at a frequency of 5 kHz, corresponding to a measurement period of 200 μs. The regions can be moved contiguously across the display or following any other order pattern, for example a random pattern. For each measurement period, the object distance or position is computed using the determined distance between the center of the illuminating region and the photon sensor 6.

In an embodiment, the different illuminating regions are moved across the display covering the whole display surface. For example, in the case of a 20-inch display, 41 cm in width and 30 cm in height, a matrix of forty-nine 5-cm-side square regions covering the whole display surface can be illuminated following the random sequence indicated in FIG. 4 by the sequence of symbols $R_1, R_2, R_3, R_i, R_{49}$. Here, using a 200 μs illumination period for each successive illuminated region, a complete illumination cycle across the whole display surface is performed in about 10 ms. The figure also shows the different emitted light paths 7 according to the different positions of the regions on the display. In another embodiment, the different illuminating regions are moved within a zone of the display which surface area is smaller than the whole display surface area. This zone may cover a connected or disconnected surface on the display, for example, by moving the illuminating regions in a contiguous or random manner across only part of the display surface area during a complete illumination cycle. The different measurements corresponding to the different 49 illuminated regions can be combined in order to provide an image or an evaluated distance.

In yet another embodiment, a single region is used as illumination source and is located in a fixed portion of the display, dedicated for the modulated light illumination.

The different display regions used for TOF illumination are successively generated using the backlighting driver 4 by successively modulating the backlighting LEDs that correspond to the different regions, the backlighting LEDs being addressed individually or by sections of LEDs.

In an embodiment, the contrast of the modulated regions in respect to the overall backlight illumination is improved by increasing the intensity of the LEDs used for TOF illumination. Increasing LEDs intensity may cause heating of the modulated LEDs but this effect should be limited due to the short modulation period.

In another embodiment, only the LEDs corresponding to one of the three RGB colors are illuminated in the TOF illumination region. For example, within a TOF illumination region only red LEDs are modulated during the TOF measurement period while all RGB LEDs are on for the rest of the display.

When using IR LEDs as TOF illumination source, only the latter are modulated by the backlighting driver 4 according to the sequence described above. Similarly, the contrast of the IR modulated light in respect to the overall backlight illumination can be improved by decreasing the intensity of the visible LEDs 5 during the measurement period, on the whole display surface or only in the region where the IR LEDs are modulated. Optionally, the visible and IR LEDs can be time-multiplexed at a rate which cannot be detected by human vision. This solution requires that the visible LEDs backlight be modulated on and off. The multiplexing rate can be much slower than the modulation frequency of the IR LEDs and can be also used to prevent interference between two or more displays.

The brightness and nature of the illumination produced by the LEDs of the backlight assembly 3 may vary according to the display video content. Indeed, the display image may contain very bright and dark parts with a rapidly changing location on the display, especially in gaming applications. The dark portions may even prevent the modulated backlight to reach the sensor 6. The influence of the video content can be important especially when combining the TOF measurement technique with the triangulation method as described above. Here indeed, the modulated light intensity will vary depending on the bright or dark zone of the display the light must go through, producing unreliable TOF measurements.

In order to avoid or, at least, minimize this drawback, the video content may be modified locally in a portion of the display corresponding to the illuminated backlight region. The modification may consist in displaying a white (transparent) image in a portion of the display corresponding to the illuminated backlight region during the TOF measurement period. Here, the contrast of the white illuminated region may be reduced, especially when occurring in a white portion on the video image. Alternatively, the intensity of the LEDs used to generate the modulated light can be increased during the TOF measurement period. These features are optional and can be activated and deactivated.

In accordance with an aspect of the invention, the backlighting driver 4 comprises a driving circuit for driving the LEDs of the backlight assembly 3 according to the embodiments of the present invention. For example, such a driving circuit should allow for the independent control and/or modulation of the visible and/or IR backlight LEDs intensity. The driving circuit should also allow for successively driving the LEDS of different regions of the backlight assembly 3 as well as synchronizing the display video content with the driving of backlight LEDs. For example, the driver AS3693A made by Austria microsystems AG for big displays offers the independent control of several LED channels and allows the synchronization of the LCD backlight with the display video signal.

In accordance with another aspect of the invention, there is provided a computer program product configured to be operable on processing means (not shown) located within the backlighting driver 4 in order to carry out the driving of the visible and/or IR LEDs of the backlight assembly 3 according to the embodiments of the invention. The software product can be downloaded in a memory (not shown) associated with the processing means. The downloading operation can be performed using a storage reader device (not shown), such as a CD or DVD reader, etc., integrated on the imaging system, or a removable storage reader device (not shown), such as an external CD or DVD reader, a USB memory key or a flash memory, connected to the imaging system through a USB connector or any other type of connector. The downloading operation can also be performed in a wireless fashion.

In another embodiment, the modulated light source is provided by the display video content. Here for example, the overall display can be darkened and a region of the display emits a brighter white light.

In yet another embodiment, a display with a narrow viewing angle is used in order to lower the power consumption of the imaging system. A diffusing overlay is often placed in front of displays for increasing the viewing angle up to values close to 180°. However, wide viewing angles may be disadvantageous for TOF measurements as the total illumination power goes with the square of that angle. A low consumption imaging sensor will therefore benefit of a display with narrower viewing angles. For example, an overlay with a viewing angle comprised in the 60° to 120° range may correspond to a good trade-off between an optimum viewing angle and maximizing TOF illumination efficiency. An overlay having different viewing angles for the visible and IR LEDs may also be used.

The imaging system of the invention can be embedded in computer monitor, notebook, portable devices such as mobile phones, MP3/Portable Media Players, PDAs, etc. Possible applications include imaging such as face recognition or distance measurements. For example, the photon sensor 6 can be placed in the vicinity of the camera of a mobile phone and the phone LCD display, used as illumination source. In such a configuration, the imaging system can be used as an imaging camera or for determining the position of a user, for example, for a camera auto focus system or estimating the position of a user in a video conference system. It is also possible to place several photon sensors around the display to image the environment behind the object 8.

In another embodiment of the invention, the photon sensor 6 is mounted on a device that is remote from the display, for example, a remote controller, a computer mouse, a pointer or any similar remote devices. In such as configuration, the synchronization between the modulated emitted light 7 and the modulated reflected light 9 is not available and the phase delay as well as the distance from the object, here the remote device, cannot be determined. Such a system must therefore include a clock recovery system for synchronizing the clock signal in the display with the one in the remote device.

Figure 5:
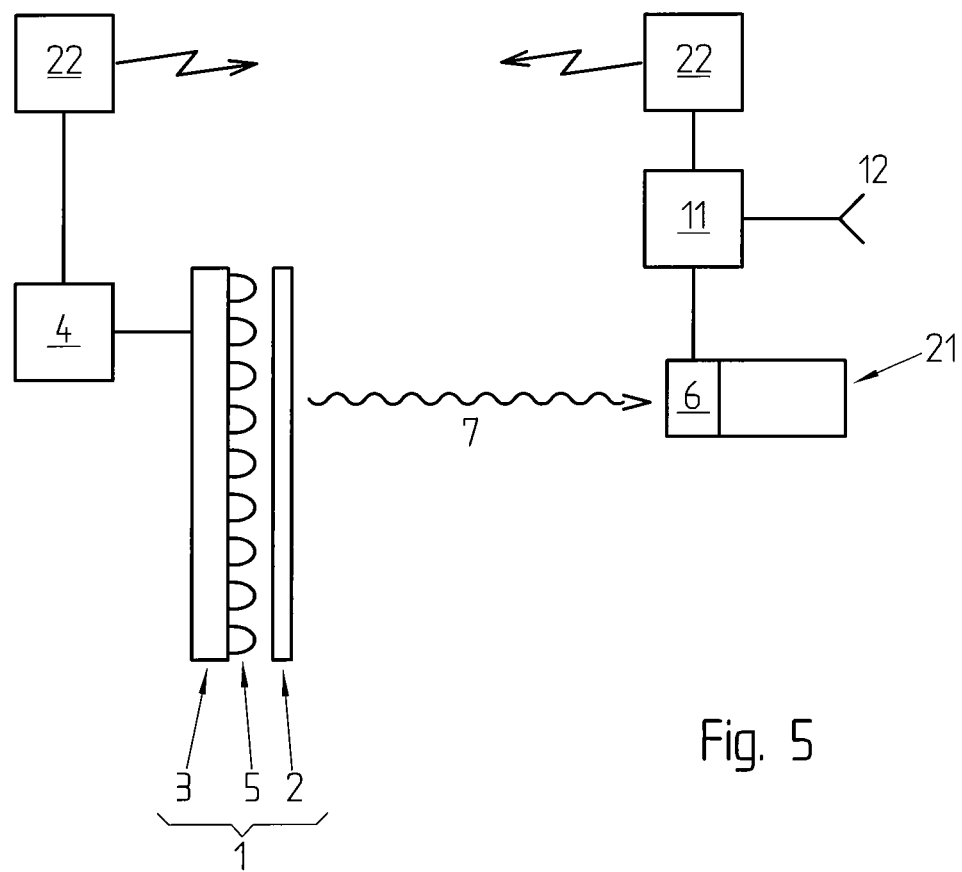
FIG. 5 represents an imaging system where the photon sensor is mounted on a remote device.

In the example shown in FIG. 5, the photon sensor 6 is mounted on a remote pointer 21. The photon sensor 6 is able to generate a modulated signal that replicates the modulated signal generated by the backlighting driver 4. Alternatively, the replicated modulated signal may also be generated by the signal processing module 11 or by a second modulation generator (not shown) located within the photon sensor 6 or in an external device.

The backlighting driver 4 comprises an internal clock (not shown) that is synchronized with the internal clock (not shown) of the photon sensor 6, or external device, by sending timestamps using regular beacon packets through a wireless transfer device 22 such as Bluetooth, 802.11 UWB (ultra wide band), and the like or through a wired connection. Here, the display and/or the remote device can be connected wirelessly or through a wired connection to a computer or a game console.

In such a configuration, the remote controller can be used, for example, as a pointer in a touch screen interactive display or in gaming applications. Here, the position of the pointer can be detected based on TOF measured between the photon sensor 6 placed on the pointer and the display. Based on the detected positions, control sequences can be sent to the computer or a game console in order to control, for example, a Power Point presentation or a game.

Reference Numbers
1 Backlit display
2 Electronic display
3 Backlight assembly
4 Backlighting driver
5 LEDs
6 Photon sensor
7 Emitted light
8 Object
9 Reflected light
10 Imaging lens
11 Signal processing module
12 Communication interface module
13 Substrate
14 Backlight cavity
15 Diffuser
16 Edge illumination assembly
17 Light guide
18 Light mixing cavity
19 Reflector
21 Remote pointer
22 Wireless transfer device

The invention claimed is:

1. A time-of-flight based imaging system comprising:
a photon emitter used as an illumination source for illuminating a scene;
a photon sensor to sense photons reflected by an object in the scene;
an electronic system for delivering a signal depending on the reception time of photons reflected by said scene onto said photon sensor,
a backlit display comprising a backlight assembly and an electronic display placed in front of the backlight assembly,
said backlight assembly comprises LEDs which are used for illuminating the electronic display and which are also used as said illumination source by superposing on the LEDs intensity normally used for lighting the display, a modulated light;
the photon sensor being configured to record the modulated light reflected by an object and,
the electronic system being configured to demodulate the modulated light reflected by an object and recorded by the photon sensor, to determine the position of said object, and the distance to said object,
wherein the system further comprises a backlighting driver for successively illuminating said photon sensor from different regions of said display, and computing means for computing the position of a light reflecting object based on light received from the different regions and a triangulation method.

2. The imaging system of claim 1, wherein said backlight assembly comprises infrared LEDs, said photon sensor being associated with an infrared filter for improving sensitivity to the infrared light emitted by said infrared LEDs.

3. The imaging system of claim 1, wherein said backlight assembly uses white LEDs, said photon detector being associated with a filter for improving sensitivity to the blue light emitted by said white LEDs.

4. The imaging system of claim 1, comprising different LEDs of different colors illuminated and/or modulated at different times.

5. The imaging system of claim 1, comprising a backlighting driver for successively emitting light used by said photon sensor from successive regions of said display.

6. The imaging system of claim 5, said backlighting driver being arranged for successively illuminating successive regions of said display.

7. The imaging system of claim 5, where the distances between each region successively lit and object are successively computed.

8. The imaging system of claim 5, said electronic display being arranged for modifying the video content displayed by said currently backlighted regions so as to increase the amount of light sent from said regions and received by said photon sensor.

9. The imaging system of claim 1, wherein a video image is used as said illumination source.

10. The imaging system of claim 1, wherein said photon sensor is mounted on different device than said electronic display, so that the position between said display and said photon sensor is not fixed, the imaging system also comprising a clock recovery system for recovering the clock signal from said display in said different device.

11. The imaging system of claim 1, as part of a game console.

12. The imaging system of claim 1, as part of a personal digital assistant or mobile phone.

13. The imaging system of claim 1, which photon sensor comprises an array of single photon avalanche photodiodes elements.

14. Illumination method for an imaging system comprising at least a backlit display comprising a backlight assembly and an electronic display placed in front of the backlight assembly, the backlight assembly comprising LEDs which are used for illuminating the electronic display and which are also used as an illumination source by superposing on the LEDs intensity normally used for lighting the display, a modulated light; a photon sensor; and an electronic system for delivering a signal by said photon sensor; comprising the steps of:
generating a modulated illumination from successively different regions of an electronic display using a backlighting driver by superposing on the LEDs intensity normally used for lighting the display, a modulated light;
computing the distances between the center of each region successively lit and the photon sensor;
recording the reception time of the modulated illumination reflected by an object or the phase delay between the emitted illumination and the reflected illumination using the photon sensor;
demodulating the modulated light reflected by an object and recorded by the photon sensor, using the electronic system, to determine the position of said object, and the distance to said object,
wherein the position of a light reflecting object is computed based on light received from the different regions and a triangulation method.

15. Illumination method according to claim 14, where display video content is modified in synchronization with the successive illumination.

16. Illumination method according to claim 14, where the regions successively illuminated are moved across the display following a random pattern.

17. A portable device comprising:
an electronic display;
a led-based backlighting system for backlighting said electronic display;
a photon detector;

an electronic system for delivering a signal depending on the time of flight of photons sent by said backlighting system, reflected by an object and received by said photon detector;

wherein LEDs of the led-based backlighting system are used for illuminating the electronic display and are also used as an illumination source to illuminate an object by superposing a modulated light on the LEDs intensity normally used for lighting the display;

the photon detector being configured to record the modulated light reflected by an object and, the electronic system being configured to demodulate the modulated light reflected by an object and recorded by the photon sensor, to determine the position of said object, and the distance to said object, wherein the system further comprises a backlighting driver for successively illuminating said photon sensor from different regions of said display, and computing means for computing the position of a light reflecting object based on light received from the different regions and a triangulation method.

18. The portable device of claim 17, further comprising computing means programmed for computing a 3D representation of said object based on said signal.

19. Computer program product containing a non-transitory computer program which is capable of being executed by processing means in order to carry out an illumination method for an imaging system comprising at least a backlit display comprising a backlight assembly and an electronic display placed in front of the backlight assembly, the backlight assembly comprising LEDs which are used for illuminating the electronic display and which are also used as an illumination source by superposing on the LEDs intensity normally used for lighting the display, a modulated light; a photon sensor; and an electronic system for delivering a signal by said photon sensor; the illumination method comprising the steps of:

generating a modulated illumination from successively different regions of an electronic display using a backlighting driver by superposing on the LEDs intensity normally used for lighting the display, a modulated light;

computing the distances between the center of each region successively lit and the photon sensor;

recording the reception time of the modulated illumination reflected by an object or the phase delay between the emitted illumination and the reflected illumination using the photon sensor;

demodulating the modulated light reflected by an object and recorded by the photon sensor, using the electronic system, when said program is executed by said processing means in order to carry out the driving of the illumination source of a time-of-flight based imaging system comprising:

a photon emitter used as an illumination source for illuminating a scene;

a photon sensor to sense photons reflected by an object in the scene;

an electronic system for delivering a signal depending on the reception time of photons reflected by said scene onto said photon sensor;

a backlit display comprising a backlight assembly and an electronic display placed in front of the backlight assembly;

said backlight assembly comprises LEDs which are used for illuminating the electronic display and which are also used as said illumination source by superposing on the LEDs intensity normally used for lighting the display, a modulated light;

the photon sensor being configured to record the modulated light reflected by an object and, the electronic system being configured to demodulate the modulated light reflected by an object and recorded by the photon sensor, to determine the position of said object, and the distance to said object, wherein the system further comprises a backlighting driver for successively illuminating said photon sensor from different regions of said display, and computing means for computing the position of a light reflecting object based on light received from the different regions and a triangulation method.

* * * * *